(12) United States Patent

Heinze et al.

(10) Patent No.: US 7,466,125 B2
(45) Date of Patent: Dec. 16, 2008

(54) POSITION TRANSMITTER AND METHOD FOR DETERMINING A POSITION OF A ROTATING SHAFT

(75) Inventors: Frieder Heinze, Hüttenberg (DE); Dirk Schäfer, Weilmünster (DE)

(73) Assignee: Feig Electronic GmbH, Weilburg-Waldhausen (DE)

( * ) Notice: Subject to any disclaimer, the term of this patent is extended or adjusted under 35 U.S.C. 154(b) by 122 days.

(21) Appl. No.: 11/176,779

(22) Filed: Jul. 7, 2005

(65) Prior Publication Data

US 2006/0006861 A1 Jan. 12, 2006

(30) Foreign Application Priority Data

Jul. 12, 2004 (DE) .................. 20 2004 010 921 U
Jul. 12, 2004 (EP) ................................. 04016309

(51) Int. Cl.
*G01B 7/30* (2006.01)
*G01R 33/09* (2006.01)
*H01L 43/08* (2006.01)

(52) U.S. Cl. .............................. 324/207.25; 324/207.21
(58) Field of Classification Search ............ 324/207.13, 324/207.2, 207.21–207.25, 251, 252, 166, 324/173, 174, 178, 179, 180
See application file for complete search history.

(56) References Cited

U.S. PATENT DOCUMENTS

| | | | |
|---|---|---|---|
| 4,079,251 A | | 3/1978 | Osann, Jr. |
| 5,475,626 A | * | 12/1995 | Viletto ........................ 361/680 |
| 5,572,120 A | | 11/1996 | Takaishi et al. |
| 5,880,586 A | * | 3/1999 | Dukart et al. ............. 324/207.2 |
| 6,326,781 B1 | * | 12/2001 | Kunde et al. ........... 324/207.21 |
| 6,429,647 B1 | | 8/2002 | Nicholson |
| 6,512,366 B2 | | 1/2003 | Siess |
| 6,523,271 B2 | * | 2/2003 | Kato ......................... 33/355 R |

(Continued)

FOREIGN PATENT DOCUMENTS

DE 42 01 328 7/1993

(Continued)

OTHER PUBLICATIONS

Honeywell Brochure, Honeywell Inc., Apr. 2004, all pages.*

(Continued)

*Primary Examiner*—Kenneth J Whittington
(74) *Attorney, Agent, or Firm*—Collard & Roe, P.C.

(57) ABSTRACT

A position transmitter for determining a position of a rotating shaft, has an AMR sensor unit or a GMR sensor unit which, for determining the position, has only one magnet disposed on a shaft to be monitored, whereby the position transmitter can be used as a single-turn and a multi-turn unit. Furthermore, a method for determining a position of a rotating shaft with the position transmitter is also provided. In accordance with the method, signals are produced using a diametrically magnetized magnet in a sensor unit, so that sine and cosine signals are obtained as output signals of the AMR sensor unit, the sine and cosine signals are digitalized, and these signals are processed by a microcontroller, with regard to the detection and evaluation of the angle of rotation, for detecting, filtering, and evaluating the number of revolutions, for detection of the direction of rotation or for data transmission of the angle of rotation and the number of revolutions to an overriding control.

23 Claims, 4 Drawing Sheets

U.S. PATENT DOCUMENTS

| | | | |
|---|---|---|---|
| 6,578,417 | B1 | 6/2003 | Eck |
| 6,727,689 | B1* | 4/2004 | Furlong et al. .......... 324/207.25 |
| 6,958,600 | B1* | 10/2005 | Affaticati et al. ....... 324/207.25 |
| 2001/0056333 | A1 | 12/2001 | Dietmayer |
| 2002/0053902 | A1* | 5/2002 | Siess ...................... 324/207.2 |
| 2002/0135497 | A1 | 9/2002 | Kimura et al. |
| 2002/0171416 | A1* | 11/2002 | Schroeder .............. 324/207.21 |
| 2003/0183024 | A1* | 10/2003 | Lohberg et al. ............. 73/865.9 |
| 2004/0070392 | A1* | 4/2004 | Hahn .................... 324/207.22 |
| 2006/0006864 | A1* | 1/2006 | Johnson et al. ............. 324/252 |

FOREIGN PATENT DOCUMENTS

| | | |
|---|---|---|
| DE | 43 03 399 | 8/1993 |
| DE | 43 13 062 | 10/1994 |
| DE | 195 43 564 | 5/1996 |
| DE | 198 49108 | 6/2000 |
| DE | 101 11 982 | 9/2001 |
| DE | 100 54 470 C2 | 5/2002 |
| DE | 102 12 859 | 10/2002 |
| DE | 102 50319 | 10/2003 |
| DE | 10250319 | 10/2003 |
| DE | 102 33 080 | 2/2004 |
| DE | 103 11 412 B3 | 5/2004 |
| EP | 0 550 794 | 7/1993 |
| EP | 0550794 | 7/1993 |
| EP | 0 995 974 | 4/2000 |
| EP | 0995974 | 4/2000 |
| EP | 11 56 249 | 11/2001 |

OTHER PUBLICATIONS

Datenblatt Microcontrollers von Motorola, Jan. 7, 2008.

* cited by examiner

POSITION TRANSMITTER AND METHOD FOR DETERMINING A POSITION OF A ROTATING SHAFT

BACKGROUND OF THE INVENTION

CROSS REFERENCE TO RELATED APPLICATIONS

Applicants claim priority under 35 U.S.C. §119 of European Patent Application No. 04/016309.9, filed Jul. 12, 2004, and German Utility Model Application No. 20 2004 010 921.2, filed Jul. 12, 2004.

1. Field of the Invention

The present invention relates to a position transmitter known as an Encoder as well as a method for determining a position of a rotating shaft.

2. The Prior Art

The state of the art (DE 198 49 108 C2, EP 0 995 974 A1) includes a rotation transmitter having a transmitter shaft that carries a first coding disk for a single-turn measurement and a second coding disk for a multi-turn measurement. Evaluation electronics are assigned to the multi-turn coding disk, which electronics pass the signals triggered by the sensor to a logic module and a subsequent counter module, which converts the signals into counter pulses.

This rotation transmitter that belongs to the state of the art has the disadvantage that a coding disk with a related sensor system and electronics is required for the single-turn measurement and the multi-turn measurement, in each instance. Furthermore, this rotation transmitter that belongs to the state of the art has the disadvantage that the sensors for counting the full revolutions simultaneously take on the function of an alarm clock device. This feature has the disadvantage that the alarm clock device requires filtering.

This rotation transmitter that belongs to the state of the art furthermore has the disadvantage that the transmitter shaft is guided into a housing in which the coding disk with the related sensor system and electronics is also disposed. This embodiment has the disadvantage that the transmitter shaft must be mounted in the housing, for one thing. In other words, complicated bearings are required. For another thing, precise adjustment must be carried out, and the housing might not be sealed against ambient influences.

Furthermore, EP 0 550 794 shows a rotation transmitter for absolute value position determination. The device for detecting whole revolutions has a mechanically closing switching element and an activation part for the switching element. The activation part is connected with the transmitter shaft. This embodiment is relatively complicated in structure. Furthermore, according to this state of the art, the transmitter shaft is also guided in the housing in which the coding disks are disposed. With this state of the art, as well, two detection devices are provided. Specifically, the detection devices are first, an angle coding disk, and second, a magnetic ring with reed switches that lie opposite the ring. Therefore this embodiment is also relatively complicated in structure.

Furthermore, a device for determining the rotation of a shaft and a giant magnetoresistance (GMR) layer system belongs to the state of the art (DE 102 50 319 A1). The device that belongs to this state of the art is configured exclusively as a single-turn unit, and therefore is not able to detect multiple revolutions.

SUMMARY OF THE INVENTION

It is an object of the present invention to provide a position transmitter for determining a position of a rotating shaft, which transmitter has a simple and cost-advantageous structure. It is a further object to provide a position transmitter that is simple to install, as well as resistant to ambient influences. It is also an object of the present invention to provide a method for determining a position of a rotating shaft, which can be implemented with a position transmitter having a cost-advantageous structure.

These and other objects are accomplished, according to one aspect of the invention, with a position transmitter for determining a position of a rotating shaft, having an AMR (anisotropic magnetoresistance) sensor unit or a GMR sensor unit in which for determining the position, only one magnet disposed on a shaft to be monitored is provided. The position transmitter unit merely has one sensor unit that is configured as a sensor unit that takes over the function of a single-turn and a multi-turn unit.

In another aspect, a method is provided for determining a position of a rotating shaft with this position transmitter. In accordance with the method, signals are produced using a diametrically magnetized magnet in a two-part AMR sensor or in two AMR sensors. The signals are produced in such a manner that sine and cosine signals are obtained as output signals of the AMR sensor unit, the sine and cosine signals are digitalized, and these signals are processed by a microcontroller, with regard to the detection and evaluation of the angle of rotation, for detecting, filtering, and evaluating the number of revolutions, for detection of the direction of rotation and/or for data transmission of the angle of rotation and the number of revolutions to an overriding control.

The position transmitter according to the invention, for determining a position of a rotating shaft, is structured with a sensor unit, so that only one magnet disposed on a shaft to be monitored is provided. In this way, the position transmitter merely has a sensor unit that takes over the function of a single-turn and a multi-turn unit. As a result, the position transmitter according to the invention has a very simple and cost-advantageous structure.

According to the invention, the position transmitter is configured so that it merely has a sensor unit for detecting the 360° angle position and, at the same time, for detecting the complete revolutions. The one sensor unit therefore takes on both tasks. The position transmitter according to the invention is furthermore configured so that no mechanically rigid connection with the shaft to be monitored is required in order to determine the position. No such connection is required because a transmitter shaft in the position transmitter can be eliminated. In other words, contact-free detection is possible.

According to a particularly preferred embodiment, an AMR (anisotropic magnetoresistance) sensor unit is used. However, it is also possible to provide GMR (giant magnetoresistance) sensor units in the position transmitter. For the sake of simplicity, the following explanations relate to AMR sensor units. In most cases, however, the explanations can be transferred to a GMR sensor unit, in the same manner.

According to another particularly preferred embodiment, the position transmitter is structured so that the AMR sensor unit is disposed in a closed housing, and that the magnet that lies opposite the sensor unit is disposed outside of the housing, in or on the shaft to be monitored.

In this way, it is possible to carry out contact-free detection of the rotational movements with the AMR sensor, which has the advantage that universal installation is possible, because no axial adjustment is necessary. The housing is furthermore_ sealed against ambient influences. No mechanical wear parts occur on the rotation transmitter, and the embodiment is cost-advantageous because no complicated bearings are necessary.

The position transmitter according to the invention is particularly advantageous for use as a rotation transmitter for gates. However, other areas of use are also possible.

According to a preferred embodiment, the position transmitter has a magnet formed as a diametrically magnetized magnet. This magnet is assigned to the AMR unit. In other words, the magnet is advantageously disposed opposite it. In addition, a microcontroller is provided. The microcontroller and the sensor unit are provided for evaluating the magnetic field of the magnet.

It is advantageous if the sensor unit is configured as a two-part AMR sensor, or the sensor unit has two AMR sensors.

According to another advantageous embodiment, the microcontroller is activated merely during the measurement times. For this purpose, an alarm clock device controlled by the magnet is provided to wake up the microcontroller.

Furthermore, the alarm clock device advantageously has at least one signal transmitter triggered by the magnetic field of the magnet. The signal transmitter can be configured as a reed switch or as a Hall element, for example. It is advantageous if one to three reed switches or Hall elements are provided. Since the power consumption of Hall elements is relatively high, the use of Hall elements is suited for a single-turn solution that permanently works with an external voltage.

According to another advantageous development, at least one battery or at least one rechargeable battery is provided to supply the microcontroller and the alarm clock device.

By means of configuring the position transmitter according to the invention with at least one battery or at least one rechargeable battery, the position transmitter reliably detects changes in position even if its voltage supply is interrupted. Furthermore, the position transmitter according to the invention demonstrates a low energy requirement, so that the position transmitter achieves a long lifetime.

The at least one battery or the at least one rechargeable battery can supply the microcontroller with voltage in the measurement mode, and the AMR sensor unit, the comparators, and the alarm clock device with voltage at least part of the time.

According to another advantageous embodiment, the alarm clock device is configured as an alarm clock device supplied by the battery by way of high-ohm resistors. In this way, the position transmitter demonstrates a lower power consumption in battery operation. The low power consumption results because essentially only the high-ohm alarm clock device is supplied by the battery, and the RAM content of the microcontroller is buffered.

The position transmitter according to the invention has at least one threshold value switch for digitalizing the sine and cosine signals of the AMR sensor unit. The threshold value switch can be configured as a comparator, for example.

In order to guarantee the longest possible power supply by the battery or the rechargeable battery, it is advantageous if the microcontroller is configured to have power-saving properties. In addition, it is advantageous if an external power supply is additionally provided.

Furthermore, it is advantageous if a parameter memory is provided, so that different parameters are stored in memory in case of a power failure, and gate positions (starting and ending position), for example, do not have to be detected all over again.

Furthermore, it is advantageous if a temperature sensor is provided, in order to guarantee that the electronic parts, in particular, are not overheated.

According to a particularly preferred embodiment, the AMR sensor unit is disposed in a closed housing, and the magnet is disposed in or on the shaft to be monitored, opposite the sensor unit, outside the housing. In this way, a separation of the transmitter shaft from the sensor unit is carried out, so that the sensor unit is disposed in the housing so as to be encapsulated and protected against ambient influences. According to this embodiment, the transmitter shaft does not pass into the housing.

It is advantageous if the magnet is disposed in a magnet carrier, which accommodates the end of the shaft to be monitored. The magnet carrier can be set onto the shaft to be monitored, for example, and fixed in place there. This embodiment has the advantage that the position transmitter according to the invention can be installed even subsequently, in simple manner.

According to another advantageous embodiment, the housing has a recess that at least partially accommodates the magnet carrier, in the region of the AMR sensor unit. This recess has the advantage that the arrangement of the transmitter shaft with the magnet or the magnet carrier is established relatively clearly, in that the magnet or magnet carrier disposed on the transmitter shaft is disposed in the recess. Because the sensor unit is disposed in the region of the recess, the magnet is automatically disposed opposite the sensor unit, if it is also disposed in the recess.

It is advantageous if the magnet carrier is disposed in the recess without contact. This embodiment has the advantage that installation is very simple, since attention needs to be paid only to disposing the magnet carrier in the recess. A precise alignment of the transmitter shaft with the magnet carrier is not necessary.

According to another advantageous embodiment, the magnet carrier that accommodates the transmitter shaft is mounted in the recess by means of at least one ball bearing. In this case, the ball bearing is structured to be very simple, since the demands on the bearing are not very great.

It is advantageous if the magnet carrier is configured as a magnet carrier that is adaptable on the shaft to be monitored. The magnet carrier can be disposed on the shaft in simple manner. As a result, it is possible to fit or retrofit a transmitter shaft with the position transmitter according to the invention in simple manner.

It is advantageous if a very strong magnet, for example having a magnetic field of at least fifty milliTesla (mT), is used. In this way, the position transmitter according to the invention demonstrates a relatively great tolerance range in the interplay between magnet and sensor. In this connection, the AMR sensor is operated in saturation, so that a very low influence of outside fields occurs.

It is advantageous if the housing is made of plastic. In this way, the housing can be produced very price-advantageously. It is also possible to use another non-ferromagnetic material.

Depending on the area of application, it is advantageous to dispose at least one shield plate against magnetic interference fields in the housing. In this way, a magnetic interference field within the housing can be shielded. No requirements with regard to ambient influences are set for the shield plate, since it is encapsulated in the housing. The influence of an interference field, which is low in any case, can be almost completely ignored even at high resolution.

The device according to the invention has the advantage that the housing can be produced inexpensively and in complex forms, if it is made of plastic. It is corrosion-resistant, has a low weight and high density. Furthermore, it demonstrates the advantage that a poor heat transition from a hot drive to the electronics, for example, is present.

No seal requirements are set for the magnet carrier. As a result, the device would function even under water, in an extreme case.

If a ball bearing mounts the magnet carrier in the recess of the housing, a ball bearing that is advantageous can be used because there are no precision requirements for the ball bearing.

Another advantage of the position transmitter according to the invention is that the encapsulation of the sensor unit prevents the influence of dust, moisture, grease, oil, and the like.

It proves to be particularly advantageous that no mechanical connection between the shaft to be monitored and the sensor is provided in the housing interior. In this way, a transfer of vibrations, shock, and oscillations of the shaft to the sensor is avoided. Furthermore, good thermal insulation is obtained. According to the state of the art, a metallic connection into the housing interior is provided, which brings about good heat conductivity from the hot drive to the electronics. As a result, the electronics and any battery that might be provided are heated up unnecessarily.

The contact-free detection of the revolutions also has the advantage that high speeds of rotation can be detected. In addition, a high mechanical lifetime is achieved, even in a rough environment.

Another advantage of the invention is that if a housing lid is provided, the lid can be opened even "in the field," since the electronics are not sensitive to contamination, moisture, etc. In this way, the advantage is achieved that parts of the sensor unit, or a battery, for example, can be easily replaced without additional mechanical effort. Furthermore, terminals can be structured in plug-in manner in the housing interior, so that no expensive and sealed special plugs need be used.

The position transmitter according to the invention is preferably used to detect gate positions. In this connection, the embodiment of the shaft can involve a direct motor shaft (up to 6000 revolutions per minute), the gear mechanism power take-off shaft, or the gate shaft, or a special shaft specially provided for detecting position, affixed on the drive or on the gate mechanism.

According to the preferred method for determining a position of a rotating shaft with the position transmitter according to the invention, signals are produced using a diametrically magnetized magnet in a two-part AMR sensor or in two AMR sensors. The signals are produced in a manner such that sine and cosine signals are obtained as output signals of the AMR sensor unit, that the sine and cosine signals are digitalized, and that these signals are processed by a microcontroller, with regard to the detection and evaluation of the angle of rotation, for detecting, filtering, and evaluating the number of revolutions, for detection of the direction of rotation and/or for data transmission of the angle of rotation and the number of revolutions to an overriding control.

The AMR sensors or the two-part AMR sensor emit voltages that pass through a sine shape and a cosine shape, twice, in each instance, seen over the entire angle of rotation of the magnet. The threshold value switches, for example the comparators, digitally evaluate the voltage signals. They switch at the zero passage of the voltages, in each instance.

Because of the magnet that rotates with the transmitter shaft, the at least one signal switch of the alarm clock device for the microcontroller is also activated.

According to an advantageous embodiment of the invention, the microcontroller automatically switches into a sleep mode after having evaluated the signals.

After the microcontroller is awakened, it advantageously activates the AMR sensor unit and the at least one threshold value transmitter.

The method according to the invention is characterized in that the position data are derived exclusively from the signals of the AMR sensor unit. It is advantageous that the number of revolutions is determined using the zero passages of the sine and cosine signals of the AMR sensor unit.

The position transmitter and method according to the invention have the advantage that because of the AMR sensor unit and the diametrically magnetized magnet, the sensor unit resolves 180° revolutions of the magnet. In this way, an analog/digital resolution of the microcontroller for 180° can be utilized. For example, 12 bits for 180° are used, instead of 360° in the case of usual coding disks.

Since the revolutions have to be counted in any case, no additional effort is present for the 180° sector recognition.

The resolution for a full revolution, in other words for 360°, therefore amounts to 13 bits, for example, namely the resolution of the ADC (12 bits, for example), plus one bit.

By means of the AMR sensor technology, higher tolerances in the distance between magnet and sensor are permitted. In this way, a bearing-free and contact-free embodiment becomes practicable for a gate builder.

By means of the use of a magnetoresistive sensor unit, for example in place of a Hall sensor, the direction of the magnetic field is measured, in place of the field intensity. In this way, the advantage is obtained that the influence of outside fields is less. In addition, greater distances can be evaluated without the influence of interference fields, for example in the millimeter range as compared with the 1/10 millimeter range.

Because of the mechanical separation between sensor and magnet, a higher tolerance range is possible in simple manner.

The magnetoresistive sensor unit has the advantage, as compared with optical disks, that mechanical separation between the sensor electronics and the position transmitter is possible. In this way, one obtains the possibility of sealing the housing, and an inexpensive mechanism, by means of the bearing-free variant of the magnetic carrier in the recess of the housing, according to the invention.

The sensor unit, which is encapsulated in the housing, is shielded against ambient influences, for example against condensation, against dust, shock, and vibrations, etc., particularly even during operation.

Because the position transmitter according to the invention demonstrates low power consumption, the multi-turn signals can be derived from the single-turn sensor. With optical systems, battery-supplied detection can be implemented over only very short periods of time, or with only very large batteries, because of the high power consumption.

According to the method according to the invention, the magnetic field of the magnet affixed to the shaft to be monitored is evaluated by the two-part AMR sensor or by the two AMR sensors that produce sine and cosine signals, and by two reed switch contacts. In this connection, the position data are derived exclusively from the signals of the AMR sensor. The 180° monitoring that is based on an analog value detection is active only as long as the device as a whole is supplied with external voltage. The number of revolutions is determined using the zero passages of the sine and cosine signal. If the external voltage supply is removed, a buffer battery is activated by the microcontroller. This battery supplies the microcontroller and a wake-up circuit that advantageously is made up of two reed switches that are supplied from the battery by way of high-ohm resistors. If the magnet turns, the reed switches are activated and deactivated, respectively, in certain positions of the magnet, for example approximately 15° before and after the zero passages of the sine or cosine, in each instance. Each switching flank wakes the microcontroller, which is permanently on voltage. The microcontroller in turn now activates the AMR sensor and a two-part comparator stage, for a short time, for example 100 microseconds. The comparator outputs in turn characterize the position of the magnet relative to the sensor in 45° steps. Using the secure switching state, the counter status can now be determined. In addition, a plausibility check can take place by way of the time progression of the signals. In other words, the plausibility check can take place by way of the prior history and the switching state of the reed contacts. This feature has the advantage that one is not dependent on the high-ohm rebound signals of the reed switch.

The voltage supply of the individual modules can take place in three parts:

1. External supply:
   Here, all modules are activated. The microcontroller operates the interface and the integrated ADC, including the related amplifier. In this connection, a power consumption of approximately 100 milliamperes is present.

2. Battery supply in the sleep mode:
   Only the sleeping microcontroller and the reed switches are supplied. In this connection, a power consumption of approximately three microamperes is present.

3. Battery supply in the measurement mode:
   The running microcontroller is supplied; part of the time, the AMR sensors and the comparators are supplied (for approximately 100 microseconds every two milliseconds), as well as the reed switches.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
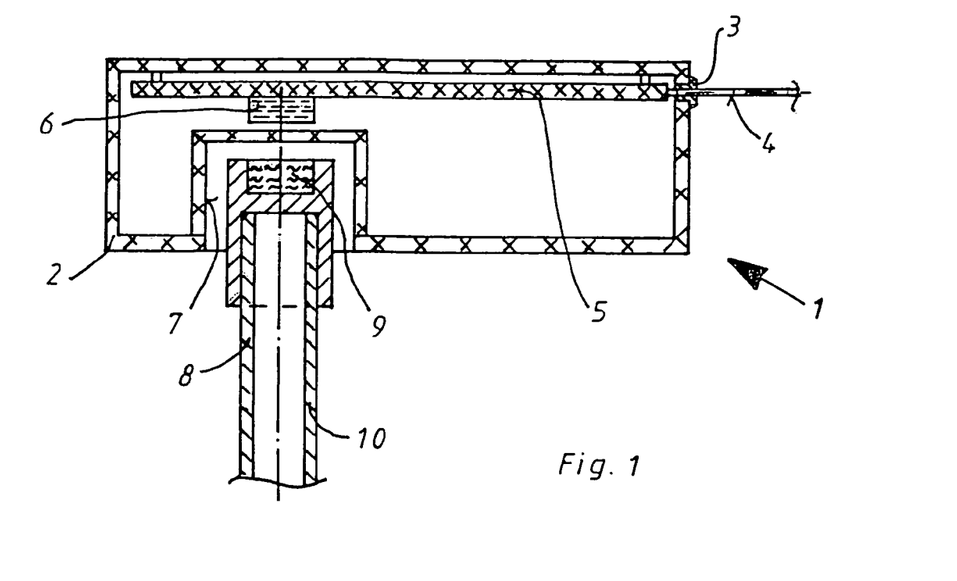
FIG. 1 shows a position transmitter according to the invention, in longitudinal cross-section.

Referring now in detail to the drawings, FIG. 1 shows a position transmitter 1 having a housing 2, which is completely closed and is made of plastic. Only one sealed line insertion 3 for a cable 4 is provided. A board 5 is disposed in housing 2, which board carries an AMR sensor unit 6. A recess 7 is provided in housing 2, in which a magnet carrier 8 is mounted without contact, with a magnet 9 disposed in magnet carrier 8. Magnet carrier 8 is disposed on a shaft 10, the number of revolutions of which is supposed to be determined.

Magnet carrier 8 is disposed in recess 7 without contact. Because of the contact-free arrangement, a relatively great tolerance range is present in the interplay between magnet 9 and sensor unit 6.

Figure 2:
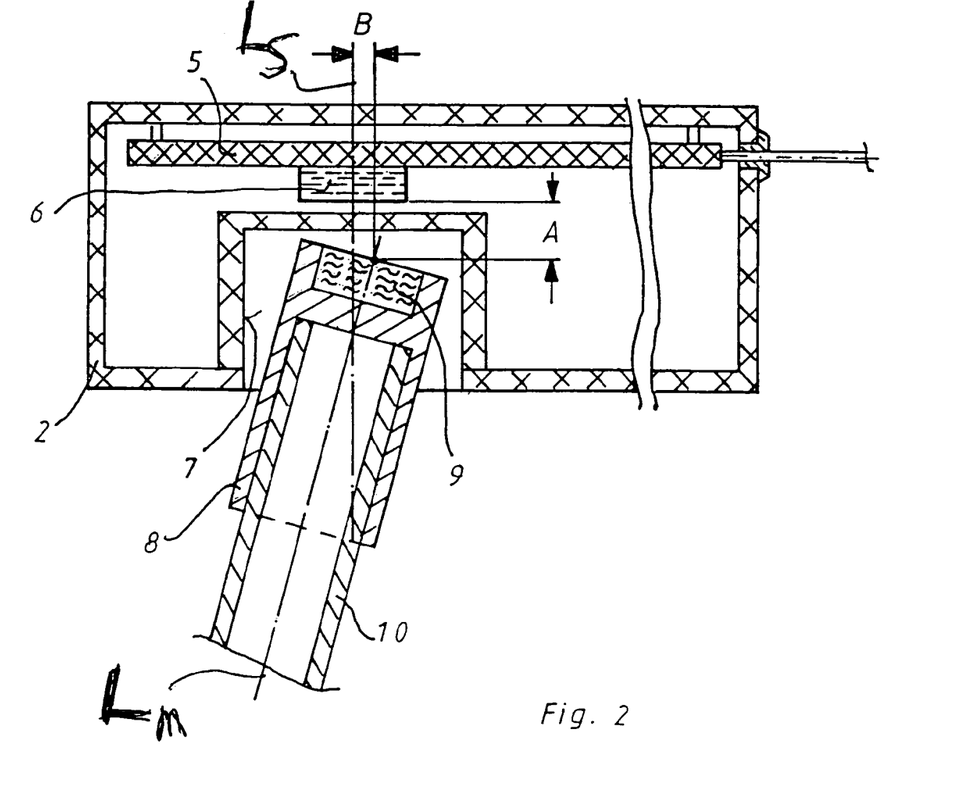
FIG. 2 is a representation of the tolerance range of a position transmitter, in longitudinal cross-section.

As is evident in FIG. 2, a tolerance is possible in the case of contact-free mounting of magnet carrier 8 in recess 7. For example, it is possible to select the axial distance (A) at up to five millimeters with a magnetic field of 50 milliTesla (mT), and the radial distance (B) at up to one millimeter.

FIG. 2 shows magnet 9 disposed outside of housing 2 and sensor 6 inside of housing 2. In FIG. 2 the contact free mounting of the magnet 9 in the recess 7 permits selecting a variable axial distance (A) between the sensor 6 and the magnet 9, and the contact free mounting permits a longitudinal axis $L_m$ of the magnet 9 to vary a radial distance (B) from a longitudinal axis $L_s$ of the sensor unit 6.

Figure 3:
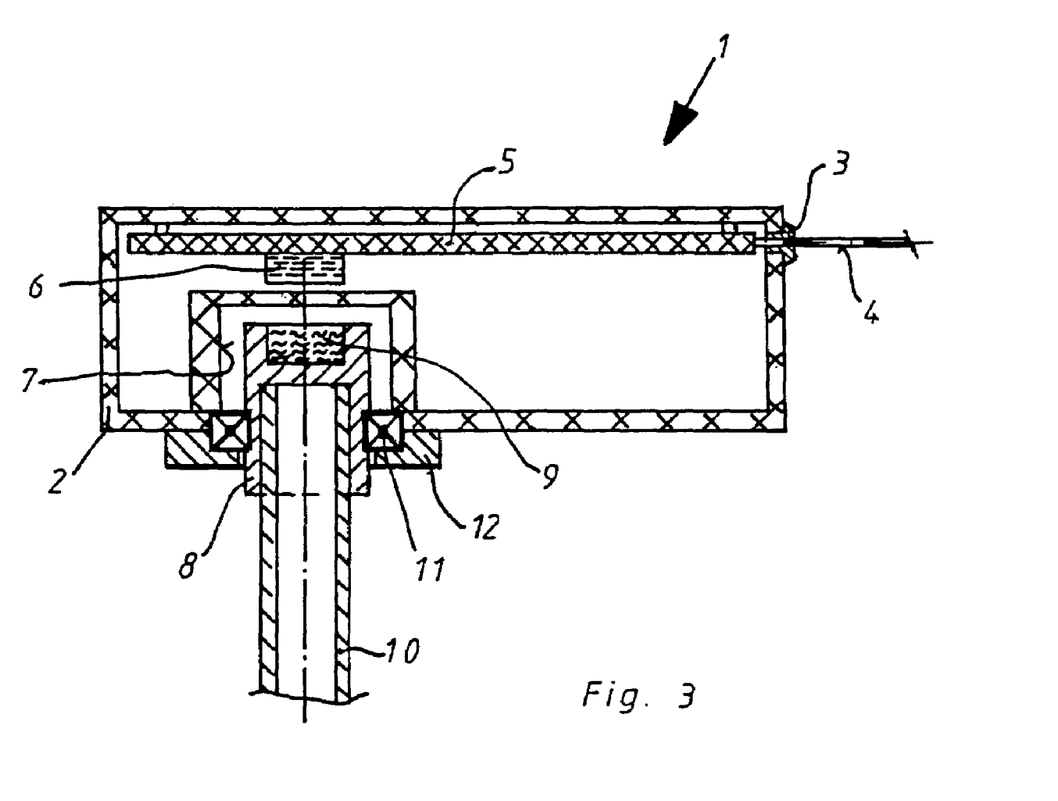
FIG. 3 shows a modified exemplary embodiment.

FIG. 3 shows position transmitter 1. Parts that are the same are provided with the reference numbers used in FIG. 1. In addition, a ball bearing 11 is disposed in recess 7, which bearing is attached to the housing by way of a holding plate 12. By means of the arrangement of ball bearing 11, a GMR sensor unit 6 can also be used in this embodiment of position transmitter 1, in simple manner, since the required tolerances are met by means of ball bearing 11.

Figure 4:
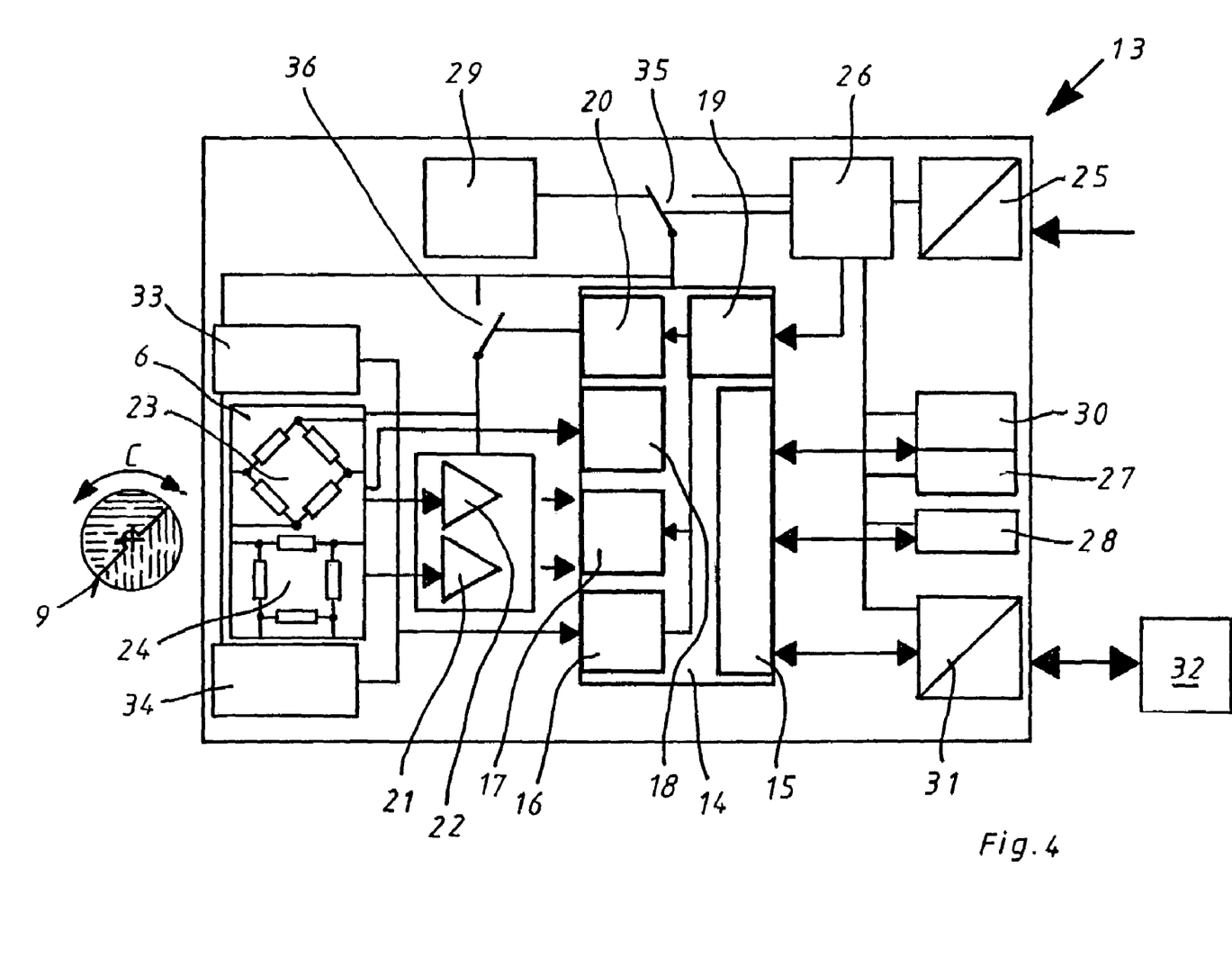
FIG. 4 is a block schematic of the electronics of the position transmitter with a magnet.

FIG. 4 shows a block schematic of the electronics. The electronics 13 of position transmitter 1 have a highly integrated microcontroller 14, which in turn contains the components low-power central processing unit (CPU) 15, interrupt-controlled alarm clock device 16, digital counter input 17, high-resolution ADC 18 with integrated amplifiers and offset determination (amplifiers can also lie outside the CPU), power-fail recognition 19 for external supply, and switching signal 20 for activation of sensor unit 6 and of comparator stages 21, 22 in case of battery operation.

Sensor unit 6 has measurement bridges 23, 24 offset by 90°, with two output signals for sine and cosine. Diametrically magnetized magnet 9, which is mounted to rotate in the direction of the double arrow (C), is disposed in front of the measurement bridges.

Electronics 13 have a supply input 25 for an external supply, preferably between 10 and 30 volts, with corresponding filter components. Furthermore, a voltage supply 26 is provided, preferably of five volts, and a low-voltage recognition of the external supply, which generates a signal to switch over to battery operation.

A parameter memory 27 serves for storing start-up positions and the like. However, depending on the battery concept, the parameter memory is not absolutely necessary. Furthermore, a temperature sensor 28 is provided to monitor the interior temperature of the transmitter, since the limit temperature of the electronic components and, in particular, of a lithium ion battery 29 is not allowed to be exceeded. The temperature is transmitted to the overriding control by means of an interface. The control can shut down the motor for a cooling period, for example, if it is responsible for the overheating. In addition, a monitoring unit 30 is provided for monitoring the battery voltage. This voltage is transferred to the overriding control as a diagnosis value. There, it is evaluated and gives the operator a message that the battery is getting weak and should be replaced.

Furthermore, an interface 31 to the overriding control 32 is provided. This interface can be an inexpensive serial asynchronous interface RS485.

The comparators 21, 22 are provided for digitalizing the sine and cosine signals of the corresponding AMR sensors. They switch at the zero passage of the signals, in each instance. Comparators 21, 22 are awakened by microcontroller 14 in battery operation, or the supply is switched on by way of microcontroller 14, respectively. The AMR signals can additionally be evaluated also by way of the ADC 18 of microcontroller 14. However, ADC 18 requires additional current and an initialization phase, so that the lifetime of battery 29 is reduced.

Electronics 13 have reed contacts 33, 34 having a high-ohm resistance. The first reed contact 33 is provided for the sine signal, and the second reed contact 34 is provided for the cosine signal. Depending on the mechanical position of magnet 9, reed contacts 33, 34 generate a switching flank that in turn wakes up microcontroller 14 that is sleeping in battery operation, and activates it for counting the interference-safe comparator signals. The switching behavior of the reed contacts is determined on the basis of the mechanical positioning of the circuit board. In this connection, the position (arrangement) of reed switches 33, 34 relative to the position of AMR sensor 6 plays a significant role.

In addition, a change-over switch 35 is provided between the battery supply and the external supply 25. Control of change-over switch 35 can take place either automatically on the basis of the absence of the external supply, or directly by microcontroller 14.

Figure 5:
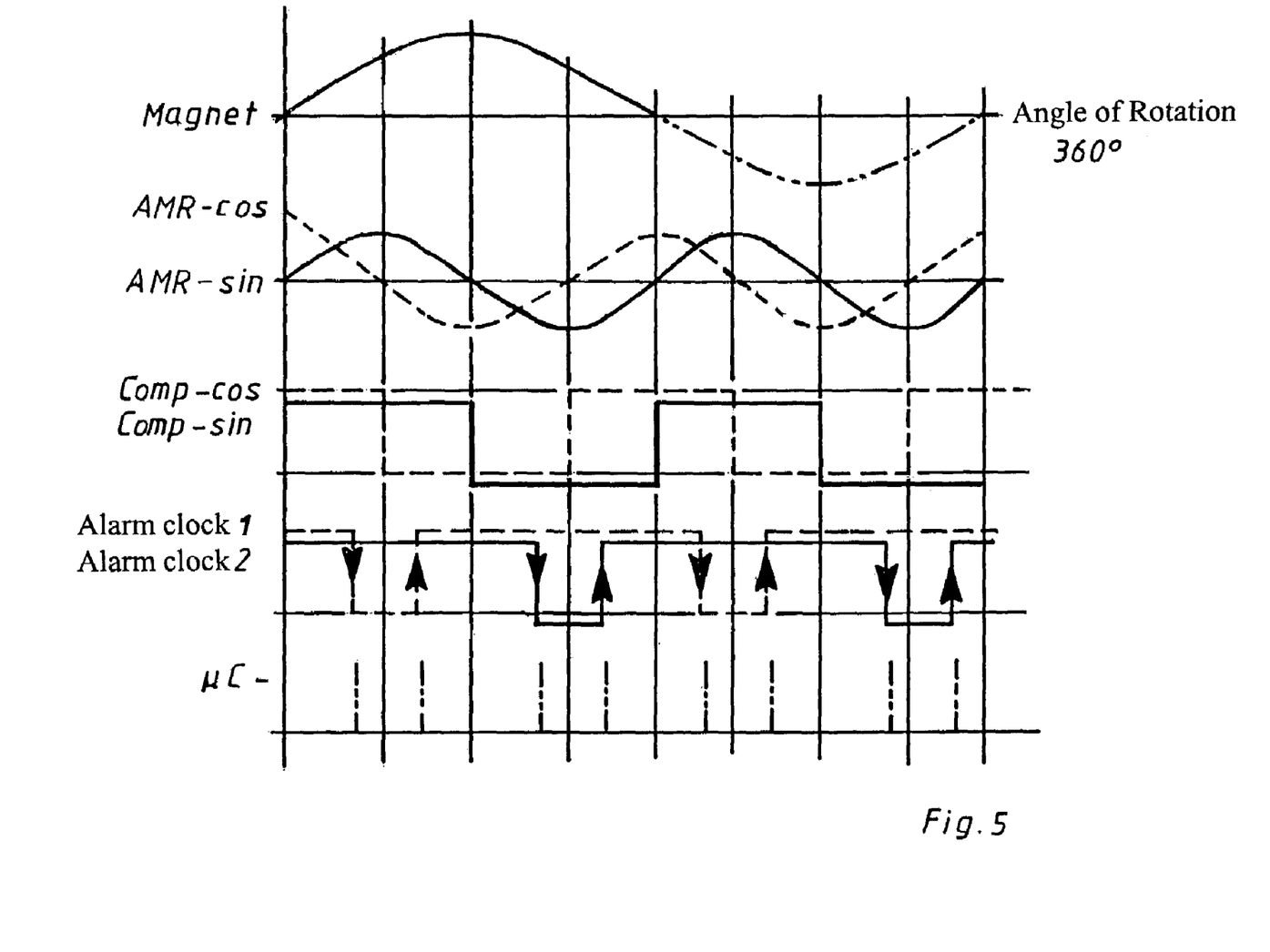
FIG. 5 is a signal flow-chart of the sensor system.

Furthermore, a switch 36 controlled by the microcontroller is provided to supply AMR sensors 6 and comparators 21, 22. As can be seen in FIG. 5, magnet 9 rotates by 360°. The two AMR sensors in sensor unit 6 emit voltages that pass through a sine shape and a cosine shape, respectively, twice over the entire angle of rotation of magnet 9, in each instance.

Comparators 21, 22 evaluate the voltage signals digitally. These signals are designated as comp-cosine and comp-sine in FIG. 5. Comparators 21, 22 switch at the zero passages of the voltages, in each instance. The signals (alarm clock 1, alarm clock 2) are generated by reed switches 33, 34. These are mechanically disposed so that they switch approximately 15° before and after the zero passages of the AMR signals. In connection with dimensioning and positioning the sensors, attention must be paid to ensure that the signal profile approximately corresponds to the sequence shown in FIG. 5. During battery operation, microcontroller 14 is awakened by every switching flank of reed switches 33, 34, and can then decide, on the basis of the evaluation of the comparator signals, whether a false triggering exists or whether magnet 9 was turned further. In this connection, the time between the flanks does not play any role. It is easily possible that hours lie between them. Microcontroller 14 is able to detect a "clean" signal of comparators 21, 22 as soon as it was awakened, and can then decide, on the basis of the prior history of the signals, whether it is counting forwards or backwards. If the microcontroller is awakened by interference pulses on the high-ohm reed signals, for example, in other words without the magnet actually having been turned further, it merely checks the comparator signals, without continuing to count.

If microcontroller 14, after having been awakened and after the subsequent measurement cycles, recognizes that the magnet is not turning further, it independently switches back to the sleep mode and waits for the next pulse of reed switch 33, 34 as the wake-up pulse. These measurement cycles can contain a multiple measurement, due to signal stability and signal reliability.

The device according to the invention works as follows under the different voltage supply conditions:

1. As long as external supply is applied:
    analog values sine and cosine are detected at 12 bits, for example;
    counter counts half revolutions of the magnet 180°. Counting takes place by way of detection of the zero passages and the signals of comparators 21, 22 and of reed switches 33, 34;
    the complete circuit is constantly under voltage;
    the battery voltage and the temperature are monitored;
    the interfaces are active.

2. Stopped without external supply:
    battery 29 is active;
    microcontroller 14 is in sleep mode, the RAM content remains buffered;
    the AD converter remains inactive (no single-turn data);
    the AMR measurement bridges 23, 24 and comparators 21, 22 are inactive;
    reed switches 33, 34 are high-ohm but active;
    the current consumption is approximately three microamperes.

3. Movement without external power supply:
    rotating magnet 9 causes reed switches 33, 34 to switch;
    every switching flank wakes microcontroller 14;
    microcontroller 14 activates measurement bridges 23, 24 and comparators 21, 22 for approximately 100 microseconds;
    a counter status check takes place within this time;
    at 6,000 revolutions per minute, a 180° switch takes place every five microseconds, therefore the counter becomes active for 100 microseconds every millisecond;
    counting takes place with a dynamic redundancy check;
    depending on the prior results, microcontroller 14 falls asleep again;
    the power consumption during the active mode is approximately 500 microamperes, and approximately 2.5 milliamperes at the peak, respectively.

The advantage of the position transmitter 1 according to the invention lies in the fact that a very long useful lifetime is achieved with the position transmitter.

Although only a few embodiments of the present invention have been shown and described, it is to be understood that many changes and modifications may be made thereunto without departing from the spirit and scope of the invention as defined in the appended claims.

What is claimed is:

1. Position transmitter system for determining a position of a shaft that can rotate, having an AMR sensor unit or a GMR sensor unit, whereby the sensor unit is configured as a two-part AMR sensor or a two-part GMR sensor, or the sensor unit has two AMR sensors or GMR sensors, in which only a magnet (9) disposed on a shaft (10) to be monitored is provided for detecting the position,
    wherein the sensor unit (1) is used for detecting the 360° angle position and at the same time for detecting the complete revolutions and that the position data are derived exclusively from the signals of the AMR sensor unit or the GMR sensor unit, and that a microcontroller that is activated only during the measurement times is provided, and that a waking device (16) controlled by the magnet (9) is provided, for waking the microcontroller (14), and that the waking device (16) has at least one transducer (33, 34) triggered by the magnetic field of the magnet (9); and
    wherein the position transmitter system has a closed housing, the sensor unit being disposed in the closed housing, and the magnet being disposed in or on the shaft to be monitored, lying opposite the sensor unit, outside of the housing;

wherein there is a magnet carrier that can be adapted to the shaft to be monitored;

wherein the magnet carrier is disposed outside of the housing (2) without contact; and said contact free mounting of said magnet (9) outside of said housing (2) permits selecting a variable axial distance (A) between said sensor (6) and said magnet (9), and said contact free mounting permits a longitudinal axis of said magnet (9) to vary a radial distance (B) from a longitudinal axis of said sensor unit (6).

2. The position transmitter system according to claim 1, wherein the magnet comprises a diametrically magnetized magnet corresponding to the sensor unit, the sensor unit comprises an AMR sensor unit having a two-part AMR sensor or two AMR sensors having two output signals, said microcontroller and said sensor unit evaluating a magnetic field of the magnet.

3. The position transmitter system according to claim 2, wherein the microcontroller comprises an active microcontroller only during measurement times, said microcontroller comprising an alarm clock device controlled by the magnet for waking up the microcontroller.

4. The position transmitter system according to claim 3, wherein the alarm clock device has at least one signal transmitter triggered by the magnetic field of the magnet.

5. The position transmitter system according to claim 4, wherein the at least one signal transmitter comprises a Hall element.

6. The position transmitter system according to claim 3, further comprising at least one battery to supply power to the microcontroller and the alarm clock device of the microcontroller.

7. The position transmitter system according to claim 6, wherein said at least one battery comprises a rechargeable battery.

8. The position transmitter system according to claim 6, further comprising at least one threshold value switch for digitalizing the sine and cosine signals of the sensor unit.

9. The position transmitter system according to claim 6, wherein the at least one battery supplies the sensor unit, the at least one threshold value switch or the alarm clock device with voltage, in a measurement mode of the microcontroller, at least part of the time.

10. The position transmitter system according to claim 6, wherein the alarm clock device is supplied by the battery by way of high-ohm resistors.

11. The position transmitter system according to claim 2, wherein the microcontroller has power-saving properties.

12. The position transmitter system according to claim 1, further comprising an external voltage supply.

13. The position transmitter system according to claim 1, further comprising at least one parameter memory.

14. The position transmitter system according to claim 1, further comprising at least one temperature sensor.

15. The position transmitter system according to claim 1, wherein the magnet is disposed in the magnet carrier, said magnet carrier accommodating the shaft to be monitored.

16. The position transmitter system according to claim 1, wherein the housing has a recess that at least partially accommodates the magnet carrier, near the sensor unit and the magnet carrier is disposed in the recess without contact.

17. The position transmitter system according to claim 16, wherein the recess accommodates the magnet carrier with play.

18. The position transmitter system according to claim 1, wherein the magnet has a magnetic field of at least 50 milliTesla (mT).

19. The position transmitter system according to claim 1, wherein the housing is made of plastic or a non-ferromagnetic material.

20. The position transmitter system according to claim 1, further comprising at least one shielding plate against magnetic interference fields provided in the housing.

21. The position transmitter system according to claim 1, wherein the housing has at least one removable housing lid.

22. The position transmitter system according to claim 1, wherein the position transmitter is used in a gate control.

23. Position transmitter system for determining a position of a shaft that can rotate, having an AMR sensor unit or a GMR sensor unit, whereby the sensor unit is configured as a two-part AMR sensor or a two-part GMR sensor, or the sensor unit has two AMR sensors or GMR sensors, in which only a magnet (9) disposed on a shaft (10) to be monitored is provided for detecting the position, wherein the sensor unit (1) is used for detecting the 360° angle position and at the same time for detecting the complete revolutions and that the position data are derived exclusively from the signals of the AMR sensor unit or the GMR sensor unit, and that a microcontroller that is activated only during the measurement times is provided, and that a waking device (16) controlled by the magnet (9) is provided, for waking the microcontroller (14), and that the waking device (16) has at least one transducer (33, 34) triggered by the magnetic field of the magnet (9);

wherein the magnet comprises a diametrically magnetized magnet corresponding to the sensor unit, the sensor unit comprises an AMR sensor unit having a two-part AMR sensor or two AMR sensors having two output signals, and the position transmitter comprises a microcontroller, said microcontroller and said sensor unit evaluating a magnetic field of the magnet;

wherein the microcontroller comprises an active microcontroller only during measurement times, said microcontroller comprising an alarm clock device controlled by the magnet for waking up the microcontroller;

wherein the alarm clock device has at least one signal transmitter triggered by the magnetic field of the magnet;

wherein the at least one signal transmitter comprises a reed switch; and wherein the position transmitter system has a closed housing, the sensor unit being disposed in the closed housing, and the magnet being disposed in or on the shaft to be monitored, lying opposite the sensor unit, outside of the housing;

wherein there is a magnet carrier that can be adapted to the shaft to be monitored;

wherein the magnet carrier is disposed outside of the housing (2) without contact; and said contact free mounting of said magnet (9) outside of said housing (2 permits selecting a variable axial distance (A) between said sensor (6) and said magnet (9), and said contact free mounting permits a longitudinal axis of said magnet (9) to vary a radial distance (B) from a longitudinal axis of said sensor unit (16).

\* \* \* \* \*